(12) United States Patent
Demmer et al.

(10) Patent No.: US 9,150,767 B2
(45) Date of Patent: Oct. 6, 2015

(54) DEICING COMPOSITION

(75) Inventors: René Lodewijk Maria Demmer, Enter (NL); Wasil Maslow, Deventer (NL); Edwin Ronald De Jong, Deventer (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/122,881

(22) PCT Filed: Jun. 5, 2012

(86) PCT No.: PCT/EP2012/060542
§ 371 (c)(1),
(2), (4) Date: Nov. 27, 2013

(87) PCT Pub. No.: WO2012/168205
PCT Pub. Date: Dec. 13, 2012

(65) Prior Publication Data
US 2014/0110624 A1   Apr. 24, 2014

Related U.S. Application Data

(60) Provisional application No. 61/494,554, filed on Jun. 8, 2011.

(30) Foreign Application Priority Data

Jun. 8, 2011 (EP) .................................... 11169044
Nov. 9, 2011 (EP) .................................... 11188479

(51) Int. Cl.
C09K 3/18 (2006.01)
(52) U.S. Cl.
CPC .. C09K 3/185 (2013.01); C09K 3/18 (2013.01)
(58) Field of Classification Search
CPC .................................. C09K 3/18; C09K 3/185
USPC ................................................ 252/70; 106/13
See application file for complete search history.

(56) References Cited

U.S. PATENT DOCUMENTS

| | | | |
|---|---|---|---|
| 4,824,588 A | 4/1989 | Lin | |
| 5,135,674 A | 8/1992 | Kuhajek et al. | |
| 5,635,101 A | 6/1997 | Janke et al. | |
| 5,674,428 A | 10/1997 | Lott et al. | |
| 5,709,812 A * | 1/1998 | Janke et al. ................... | 252/70 |
| 5,709,813 A | 1/1998 | Janke et al. | |
| 5,922,240 A | 7/1999 | Johnson et al. | |
| 5,942,150 A | 8/1999 | Heuer et al. | |
| 5,965,058 A | 10/1999 | Janke et al. | |
| 6,080,330 A | 6/2000 | Bloomer | |
| 6,149,834 A | 11/2000 | Gall et al. | |
| 6,299,793 B1 | 10/2001 | Hartley et al. | |
| 6,440,325 B1 | 8/2002 | Hartley et al. | |
| 6,506,318 B1 | 1/2003 | Sapienza et al. | |
| 6,582,622 B1 | 6/2003 | Hartley et al. | |
| 6,593,468 B1 | 7/2003 | Lange et al. | |
| 6,596,188 B1 | 7/2003 | Hartley et al. | |
| 6,641,753 B1 * | 11/2003 | Bloomer ........................ | 252/70 |
| 6,770,217 B2 * | 8/2004 | Hartley et al. ................. | 252/70 |
| 6,861,009 B1 | 3/2005 | Leist | |
| 7,758,769 B2 | 7/2010 | Sheen et al. | |
| 7,854,856 B2 | 12/2010 | Sapienza et al. | |
| 2003/0205693 A1 | 11/2003 | Hartley et al. | |
| 2003/0209690 A1 | 11/2003 | Hartley et al. | |
| 2003/0213933 A1 | 11/2003 | Hartley et al. | |
| 2005/0017214 A1 | 1/2005 | Hartley et al. | |
| 2005/0031770 A1 | 2/2005 | Knauf | |
| 2006/0175574 A1 | 8/2006 | Bytnar | |
| 2006/0202156 A1 * | 9/2006 | Sapienza et al. ................ | 252/70 |
| 2007/0278446 A1 | 12/2007 | Koefod | |
| 2008/0128651 A1 | 6/2008 | Ossian et al. | |
| 2009/0026411 A1 | 1/2009 | Sheen et al. | |
| 2009/0314983 A1 | 12/2009 | Sapienza et al. | |
| 2010/0327215 A1 | 12/2010 | Boluk | |
| 2011/0024673 A1 | 2/2011 | Sapienza et al. | |
| 2014/0091252 A1 | 4/2014 | De Jong et al. | |
| 2014/0284518 A1 | 9/2014 | Maslow et al. | |

FOREIGN PATENT DOCUMENTS

| | | |
|---|---|---|
| CN | 1678709 A | 10/2005 |
| EP | 180568 | 5/1986 |
| EP | 404374 | 12/1990 |
| EP | 1862522 | 12/2007 |
| JP | A-S62-089785 | 10/1985 |
| JP | A-S61-108686 | 5/1986 |
| JP | A-S63-097683 | 10/1986 |
| JP | A-H03-065185 | 3/1991 |
| JP | A-H09-048961 | 8/1995 |
| JP | A-H11-035927 | 7/1997 |
| JP | A-2000-034472 | 7/1998 |
| JP | A-2001-187881 | 11/1999 |
| JP | 2000-515900 | 11/2000 |
| JP | A-2001-510490 | 7/2001 |
| JP | A-2004-269631 | 3/2003 |
| JP | A-2004-510031 | 4/2004 |

(Continued)

OTHER PUBLICATIONS

Sikkema, D. J. et al, Macromolecules, 1989, vol. 22, pp. 364-366.

(Continued)

*Primary Examiner* — Anthony J Green
(74) *Attorney, Agent, or Firm* — Kenyon & Kenyon LLP

(57) ABSTRACT

The present invention relates to a deicing composition comprising (i) a deicing agent selected from the group consisting of sodium chloride, calcium magnesium acetate, calcium chloride, magnesium chloride, potassium chloride, potassium acetate, sodium acetate, sodium formate, potassium formate, (ii) a native protein, and (iii) a thickener. It furthermore relates to a process for preparing said deicing composition and to a process for deicing a surface using said deicing composition.

20 Claims, 5 Drawing Sheets

(56) References Cited

FOREIGN PATENT DOCUMENTS

| JP | A-2006-199803 | 1/2005 |
|---|---|---|
| JP | 2005-533891 | 11/2005 |
| JP | 2006-501322 | 1/2006 |
| JP | A-2007-525959 | 9/2007 |
| JP | A-2007-327054 | 12/2007 |
| JP | A-2008-508302 | 3/2008 |
| JP | A-2012-531478 | 6/2009 |
| JP | A-2013-506753 | 10/2009 |
| WO | 97/07178 | 2/1997 |
| WO | 97/26309 | 7/1997 |
| WO | 97/34960 | 9/1997 |
| WO | 99/20657 | 4/1999 |
| WO | 00/50531 | 8/2000 |
| WO | 02-26910 | 4/2002 |
| WO | 2004/009727 | 1/2004 |
| WO | 2004-013250 | 2/2004 |
| WO | 2004063154 | 7/2004 |
| WO | 2004-112490 | 12/2004 |
| WO | 2006-015120 | 2/2006 |
| WO | 2011000081 | 1/2011 |
| WO | 2011/044135 | 4/2011 |

OTHER PUBLICATIONS

International Search Report and Written Opinion for International Application No. PCT/EP2012/060542 mailed on Jul. 4, 2012.
International Preliminary Report on Patentability for International Application No. PCT/EP2012/060542 mailed on May 29, 2013.
International Search Report and Written Opinion for International Application No. PCT/EP2012/060543 mailed on Jul. 4, 2012.
International Preliminary Report on Patentability for International Application No. PCT/EP2012/060543 mailed on Jun. 28, 2013.
Office Action from New Zealand Application No. 617459, dated on Sep. 9, 2014.
Abstract of the Journal of Dairy Research, vol. 55, Issue 03, Aug. 1988, pp. 443-448.
International Search Report for International Application No. PCT/EP2012/071678, mailed on Feb. 7, 2013.
International Preliminary Report on Patentability for International Application No. PCT/EP2012/071678, mailed on Feb. 11, 2014.
European Search Report for European Application No. EP 11188481.3, completed Mar. 26, 2012.
CROW publication 146a, 2005. Corresponds to new version CROW Handboek visuele inspectie 2011 as provided.
Derwent-Acc-No: 2010-D19617, abstract of Chinese Patent Specification No. CN 101665338 A (Mar. 2010).
Fly Ash, http://en.wikipedia.org/wiki/Fly_ash (last visited Dec. 10, 2014).
Plaster, http://en.wikipedia.org/wiki/Plaster (last visited Dec. 10, 2014).
Slag, http://en.wikipedia.org/wiki/Slag (last visited Dec. 10, 2014).
Lime plaster, http://en.wikipedia.org/wiki/Lime_plaster (last visited Dec. 10, 2014).
Whey, http://en.wikipedia.org/wiki/Whey (last visited Oct. 9, 2014).
Niro Inc., Filtration Division, Concentration of the Raffinate Fraction from Beet Molasses Desugarization Chromatographic Separators, Hudson, Wisconsin.
Japanese Office Action from Japanese Patent Application No. 2014-514028, mailed on Dec. 16, 2014 (English-language Office Action Report and English-language translation of Office Action).
Japanese Office Action from Japanese Patent Application No. 2014-514029, mailed on Dec. 16, 2014 (English-language Office Action Report and English-language translation of Office Action).
Eurasian Office Action from Eurasian Patent Application No. 2013-91745, issued on Nov. 21, 2014 (English-language translation of Office Action).
Eurasian Office Action from Eurasian Patent Application No. 2013-91746, issued on Nov. 21, 2014 (English-language translation of Office Action).
Chinese Office Action from Chinese Patent Application No. 2012-0026167.4, issued on Dec. 18, 2014 (English-language translation of Office Action Report).
Chinese Office Action from Chinese Patent Application No. 2012-80055086.7, issued on Mar. 30, 2015. (English-language translation provided.).

* cited by examiner

DEICING COMPOSITION

REFERENCE TO RELATED APPLICATIONS

This application is the U.S. National Phase of PCT/EP2012/060542 filed on Jun. 5, 2012, and claims the benefit of EP Application No. 11169044.2, filed on Jun. 8, 2011, U.S. Application No. 61/494,554, filed on Jun. 8, 2011, and EP Application No. 11188479.7, filed on Nov. 9, 2011.

The present invention relates to a deicing composition and to a process for the preparation of said deicing composition. It furthermore relates to a process for deicing a surface and to a kit of parts for use in said process. Finally, it relates to the use of a combination of a native protein and a thickener for improving the efficiency of a deicing composition.

Wintry conditions provide inconveniences to roads and traffic in the form of snow or black ice. Obviously, eliminating snow, frost, and ice of roads and highways has enormous benefits for the safety. Sodium chloride (NaCl) is commonly used to control snow and ice formation on roadways, highways, and sidewalks. The sodium chloride works as a deicing agent by dissolving into precipitation on roadways and lowering the freezing point, thereby melting ice and snow. Other salts that can be used as deicers include for example calcium chloride and magnesium chloride. These compounds depress the freezing point of water to an even lower temperature than sodium chloride. Also potassium chloride is sometimes used as a deicer. Another, commonly known alternative to road salt is calcium magnesium acetate. Other, less known deicer salts include potassium acetate, sodium acetate, sodium formate, and potassium formate.

The wintry conditions also create damage to asphalt, bituminous, and concrete surfaces. These surfaces have porous structures. Especially asphalt comprises a number of subsurface channels. When the air/ground temperature becomes sufficiently low, an aqueous solution which is present in the channels of the asphalt will expand upon freezing, thus, creating mechanical stress in the asphalt. Especially after repeated freezing and thawing, the asphalt will break, resulting in potholes. Not only large sums of money have to be spent each year to repair damaged roadways and highways, potholes may also result in dangerous situations for traffic. Furthermore, the additional maintenance required will result in additional traffic jams.

The problem of damage to roadways and highways because of the expansion and contraction of water or water-based solutions during freezing and thawing cycles has become an even bigger issue since the introduction of a new type of asphalt, the so-called highly porous asphalt in the nineties. This highly porous asphalt concrete may comprise up to 20% of hollow space. This has the advantage that rain and melt water will flow away quickly from the asphalt surface through the subsurface channels into the soil. The asphalt road surface itself retains practically no moisture, and hence, is not slick and slippery even in case of heavy rainfall. While the use of this type of asphalt has an enormous beneficial effect on safety under rainy conditions, a disadvantage is that under wintry conditions more of the deicing agent is needed in order to keep the roads free of snow and ice during the winter as the deicing agent will also flow away with the melt water from the road surface.

It is an object of the present invention to provide a deicing composition which has improved deicing properties. More particularly, it is an object of the present invention to provide a deicing composition which remains effective over a longer period of time so that the deicing agent can be applied less frequently and the damage to especially highly porous road surfaces will be reduced even after repeated freezing and thawing.

Surprisingly, the objective has been met by adding a combination of two types of additives, viz. a protein and a thickener, to a deicing agent. In more detail, the present invention relates to a deicing composition comprising (i) a deicing agent selected from the group consisting of sodium chloride, calcium magnesium acetate, calcium chloride, magnesium chloride, potassium chloride, potassium acetate, sodium acetate, sodium formate, and potassium formate, (ii) native protein, and (iii) a thickener (with the proviso that components (ii) and (iii) are not the same).

It was found that the deicing composition according to the present invention has an improved performance. It has been found that by using the specific combination of thickener and native protein, the deicing agent will remain active over a longer period of time. Furthermore, due to better adhesion properties of the deicing composition compared to use of the deicing agent alone, less deicing agent will be blown away and deicing agent is retained on the road for a longer period of time.

In addition, it was found that the use of the deicing composition according to the present invention reduces damage to road surfaces after repeated freezing and thawing.

The deicing composition according to the present invention has been found to be less corrosive than conventional deicing compositions.

DETAILED DESCRIPTION

Figure 1:
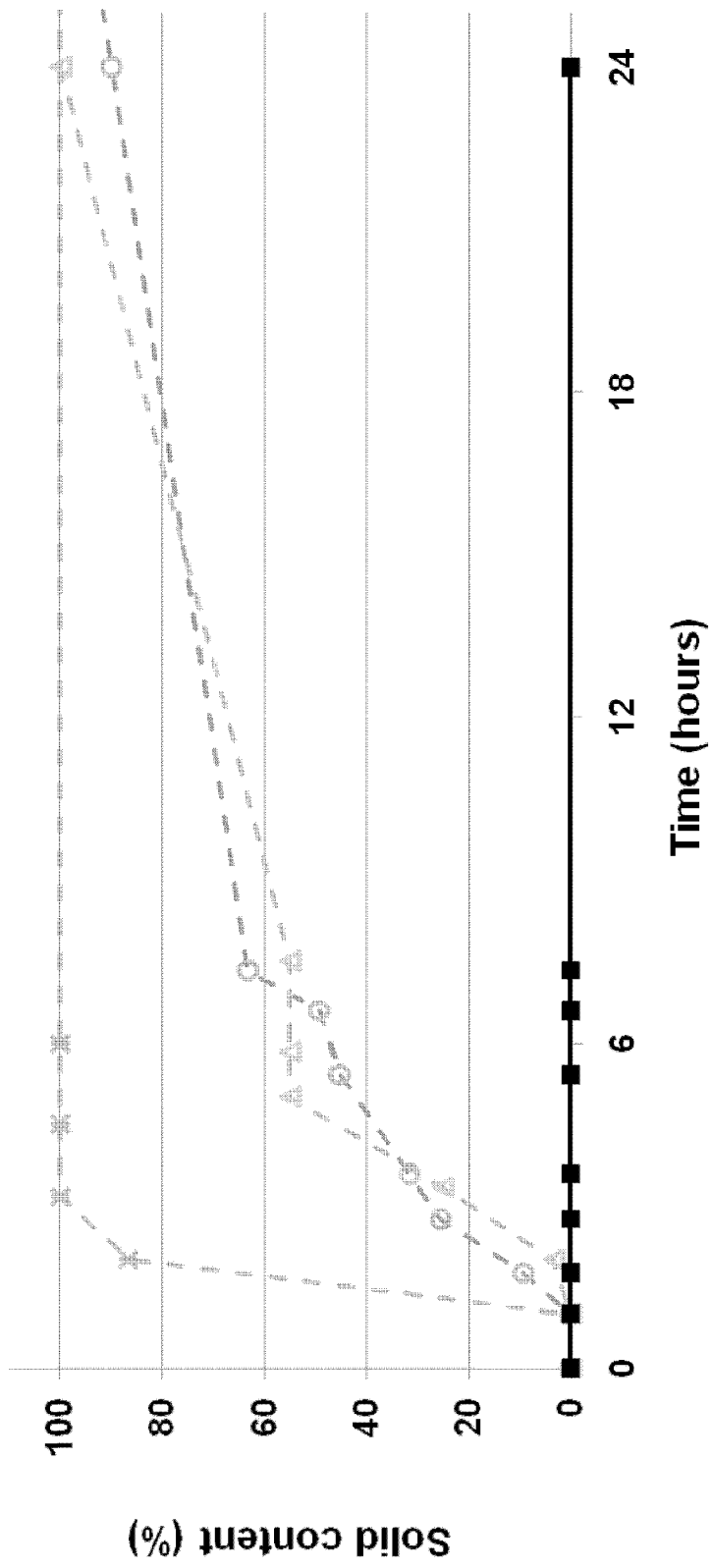
FIG. 1 is a graph of solid content (%) versus time (hours), showing the results of Comparative Examples A, B and P, and Example 5.

The deicing agent present in the deicing composition according to the present invention is selected from the group consisting of sodium chloride, calcium magnesium acetate, calcium chloride, magnesium chloride, potassium chloride, potassium acetate, sodium acetate, sodium formate, and potassium formate. Preferably, however, the deicing agent is a chloride salt, i.e. it is preferably selected from the group consisting of sodium chloride, calcium chloride, magnesium chloride, and potassium chloride. More preferably calcium chloride is used as the deicing agent in the compositions according to the present invention. Most preferably, sodium chloride is used as the deicing agent in the compositions according to the present invention as it is cheap and available in large quantities.

If the deicing composition is an aqueous composition, the deicing agent is preferably present in an amount of at least 5% by weight, more preferably at least 10% by weight and most preferably at least 20% by weight (based on the total weight of the deicing composition). Preferably, such aqueous deicing composition comprises at most the saturation concentration of the deicing agent. The deicing composition according to the present invention can also be in the form of a slurry, containing deicing agent at concentrations higher than the saturation concentration. If the deicing composition is in the form of a solid, it may comprise as little as 5% by weight of deicing agent (based on the total weight of the deicing composition), if it is, for example, mixed with gritting material like sand. However, preferably, the deicing composition according to the present invention comprises at least 50% by weight of the deicing agent, yet more preferably at least 70% by weight, and most preferably at least 96% by weight of the deicing agent (based on the total weight of the deicing composition).

The protein according to the present invention is a protein which is in its native form. In other words, it is a non-denatured protein. As the skilled person knows, proteins (or rather polypeptides in general) can lose their secondary and tertiary structure if exposed to chemical, physical stress or mechanical stress, such as a strong acid or base, urea, an organic solvent or heat. Proteins that are denatured under such harmful circumstances are no longer suitable for use in the deicing composition according to the present invention as they have lost their effectiveness. Accordingly, with the terms "native protein" and "protein in its natural state" it is meant that the protein has not been altered under denaturing conditions such as heat, chemicals, enzyme action or the exigencies of extraction.

For the sake of clarity it is noted that the protein according to the present invention is not a protein as present in molasses.

The protein suitable for use in the composition according to the present invention is preferably a protein selected from the group consisting of soy based proteins, dairy based proteins, egg proteins and combinations thereof.

In one embodiment, for example, the protein is spray dried egg white powder, yolk from eggs, or mixtures thereof.

The protein is typically present in the deicing composition according to the present invention in an amount at least 10 ppm, more preferably at least 100 ppm and most preferably at least 500 ppm. It is preferably present in an amount of less than 10.000 ppm, more preferably in an amount of less than 8.000 ppm and most preferably, in an amount of less than 5.000 ppm.

The protein concentrations are expressed in ppm, herewith defined as mg protein per kg of the total deicing composition.

The thickener suitable for use in the composition according to the present invention is preferably a thickener selected from the group consisting of lignin derivatives, thickeners with a cellulosic/starch based backbone, thickeners with a gallactomannan based backbone (like guar gum), thickeners bearing sulphonate or sulphonic acid functionality or salts thereof, thickeners bearing carboxylic acid functionality or salts thereof, and combinations thereof. The thickener is more preferably selected from the group consisting of carboxymethyl cellulose, salts of carboxylmethyl cellulose, guar gum, nanocellulose, ethyl hydroxyethyl cellulose, methylethyl hydroxyethyl cellulose, propoxycellulose, methoxycellulose, ethoxycellulose, hydroxyethylcellulose, lignin derivatives, polyacrylates, polymaleinates, and copolymers of polyacrylates and polymaleinates. It is also possible to use a mixture of two or more of these thickeners.

It is noted that, although less preferred, the thickener can be a protein having thickener properties, e.g. gelatin. It is noted, however, that components (ii) and (iii) in the composition according to the present invention cannot be identical. In other words, if component (iii) is a protein having thickener properties, component (ii) is a native protein according to the present invention which is different from component (iii), A synergistic effect of components (ii) and (iii) is merely observed in case said components differ from one another.

In a preferred embodiment, the thickener is a lignin derivative. The biopolymer lignin is an amorphous polymer related to cellulose that provides rigidity and together with cellulose forms the woody cell walls of plants and the cementing material between them. It generally has a molecular weight of at least 10.000 Da. Lignin is most commonly found in wood, but can also be found in plants and algae. It consists of the monolignols paracoumaryl alcohol, coniferyl alcohol and sinapyl alcohol. These monomers are incorporated in varying amounts.

Lignin can be rendered water-soluble by exposing it to acidic or alkali conditions or bleached (treated with e.g. $H_2O_2$ or hypochlorite), thus increasing the number of aliphatic and aromatic hydroxyl and carboxylic acid functionalities or hydrolyzing it to lower molecular fragments. Under neutral conditions, lignin can be hydrophilized by sulfite pulping while introducing sulphonate or sulphonic acid functionality.

The term "lignin derivative" as used throughout the specification, is meant to denote all compounds derived from lignin using at least one of the just-described procedures and which have a solubility of at least 10 g per liter in water at 25° C. Other chemical functionalities may be present as long as they do not compromise the overall water-solubility. Preferably, the lignin derivative according to the present invention has an average molecular weight of at least 5 kDa, more preferably at least 10 kDa. Most preferably, the lignin derivative carries carboxylic acid functionality, while most preferably, it carries sulphonate or sulphonic acid groups (i.e. it is a lignosulphonate).

A lignosulphonate, according to the present invention, is a sulphonated lignin derived from the biopolymer lignin. During the pulping process of wood in presence of sulphite, the lignosulphonate is produced as a by-product. The product can be (chemically) purified and spray dried, though neither of these steps is required for a good efficacy in accordance to the present invention. Lignosulphonates have very broad ranges of molecular mass (they are very polydisperse). For example a range of from 1000-140,000 Da has been reported for softwood. Lignosulfonates with lower values have reported for hardwoods.

The lignin derivative suitable for use in the composition according to the present invention is preferably a lignin derivative derived from wood, plants or algae. It is also possible to use a mixture of lignin derivatives originating from different sources. Most preferable is the use of a lignin derivative derived from wood. All types of lignin derivatives can be used in the composition according to the present invention, i.e. the Na, K, Ca, Mg, or $NH_4$ salts.

In a preferred embodiment, the thickener is carboxymethyl cellulose having a degree of substitution (i.e. the average number of carboxymethyl ether groups per repeating anhydroglucose chain unit of the cellulose molecule) of between 0.4 and 1.0, and an average degree of polymerization of between 3000 and 8000.

It is noted that a skilled person will understand that the term "degree of polymerization" refers to the average degree of polymerization, which means the average number of glucose units in the cellulose polymer chain. The degree of polymerization is determined by the formula $DP=Mn/Mo$, wherein Mn is the number average molecular weight and Mo is the molecular weight of a monomeric unit.

A series of commercially available binders containing sodium carboxymethyl cellulose especially useful in the present invention is available from AkzoNobel, under the trademark Akucell™.

The carboxymethyl cellulose to be used in accordance with the present invention can be obtained by the processes described by D. J. Sikkema and H. Janssen in *Macromolecules*, 1989, 22, 364-366, or by the process disclosed in WO 99/20657. The procedures and apparatus to be used are conventional in the art and variations on these known procedures can easily be made by a person skilled in the art using routine experimentation. Various sources of cellulose can be used, including bagasse.

The carboxymethyl cellulose to be used in accordance with the present invention typically is used as a dry powder, but it can also be supplied as a suspension or as an aqueous solution. Furthermore, the carboxymethyl cellulose according to the invention can be a purified grade or a technical grade (containing the by-products NaCl and sodium glycolates).

The thickener is typically present in the deicing composition according to the present invention in an amount of at least 10 ppm, more preferably at least 100 ppm and most preferably at least 500 ppm. In case of an aqueous deicing composition, the thickener can be present in an amount up to its saturation concentration. The thickener is preferably present in the deicing composition according to the invention in an amount of less than 10.000 ppm, more preferably in an amount of less than 8.000 ppm and most preferably, in an amount of less than 5.000 ppm.

The thickener concentrations are expressed in ppm, herewith defined as mg thickener per kg of the total deicing composition.

The present invention furthermore relates to a process for preparing the deicing composition according to the present invention. Said process of spraying an aqueous treatment solution comprising a native protein and a thickener, onto a deicing agent selected from the group consisting of sodium chloride, calcium magnesium acetate, calcium chloride, magnesium chloride, potassium chloride, potassium acetate, sodium acetate, sodium formate, and potassium formate. Preferably, the aqueous treatment solution is sprayed onto the deicing agent in an amount so that the resulting deicing composition will comprise at least 10 ppm, more preferably at least 100 ppm and most preferably at least 500 ppm of the protein and at least 10 ppm, more preferably at least 100 ppm and most preferably at least 500 ppm of the thickener. Preferably, the resulting deicing composition comprises no more than 10.000 ppm, more preferably no more than 8.000 ppm and most preferably, no more than 5.000 ppm of the protein. Preferably, the resulting deicing composition comprises no more than 10.000 ppm, more preferably no more than 8.000 ppm and most preferably, no more than 5.000 ppm of the thickener.

As described above, the protein is preferably selected from the group consisting of soy based proteins, dairy based proteins, egg proteins and combinations thereof. The thickener is preferably selected from the group consisting of thickeners with a cellulosic/starch based backbone, thickeners with a guar based backbone, thickeners bearing sulphonate or sulphonic acid functionality or salts thereof, thickeners bearing carboxylic acid functionality or salts thereof, and combinations thereof. More preferably, the thickener is selected from the group consisting of carboxymethyl cellulose, salts of carboxylmethyl cellulose carboxylmethyl cellulose, guar gum, nanocellulose, ethyl hydroxyethyl cellulose, methylethyl hydroxyethyl cellulose, propoxycellulose, methoxycellulose, ethoxycellulose, hydroxyethylcellulose, lignin derivatives, polyacrylates, polymaleinates, and copolymers of polyacrylates and polymaleinates.

As described above, the protein and the thickener are not equal. If the thickener is a native protein having thickener properties, a different type of native protein is added to the deicing agent.

The present invention furthermore relates to a process for deicing a surface. Said surface can be deiced in various ways.

In one embodiment the deicing composition according to the present invention is spread onto said surface.

In another embodiment, the process for deicing a surface comprises the steps of mixing a solid deicing agent selected from the group consisting of sodium chloride, calcium magnesium acetate, calcium chloride, magnesium chloride, potassium chloride, potassium acetate, sodium acetate, sodium formate, and potassium formate with an aqueous treatment solution comprising a native protein and a thickener, and spreading the thus obtained mixture onto said surface. This method according to the present invention is a preferred embodiment since the risk that the deicing composition is blown away is greatly reduced. Furthermore, a better adhesion of the deicing composition to the road surface is attained.

In yet another embodiment, the process for deicing a surface comprises the steps of preparing an aqueous solution comprising between 5% by weight and the saturation concentration of a solid deicing agent selected from the group consisting of sodium chloride, calcium magnesium acetate, calcium chloride, magnesium chloride, potassium chloride, potassium acetate, sodium acetate, sodium formate, and potassium formate; a native protein and a thickener and applying said mixture onto said surface, e.g. by spraying. This method according to the present invention is also a preferred embodiment since the risk that the deicing composition is blown away is also in this method greatly reduced. Furthermore, a better adhesion of the deicing composition to the road surface is attained.

In yet another embodiment of the present invention, the process for deicing a surface comprises the steps of spreading a deicing agent selected from the group consisting of sodium chloride, calcium magnesium acetate, calcium chloride, magnesium chloride, potassium chloride, potassium acetate, sodium acetate, sodium formate, and potassium formate in solid or aqueous form onto said surface and separately spreading a native protein and a thickener in solid or aqueous form onto said surface.

The surface to be deiced is preferably a surface selected from the group consisting of non-porous asphalt road, asphalt road, porous asphalt road, concrete road, bituminous road, brick road, graveled path, cobbled road, unpaved road, and pavement.

Preferably at least 1 g of deicing agent, at least 0.01 mg of protein and at least 0.01 mg of thickener is introduced per $m^2$ of said surface. Preferably, no more than 50 g of deicing agent is introduced per $m^2$ of surface to be deiced. Preferably, no more than 500 mg of protein and no more than 500 mg of thickener are introduced per $m^2$ of surface to be deiced.

In yet another aspect of the present invention, it relates to a kit of parts for use in the process for deicing a surface. The kit of parts comprises an anti-icing composition comprising a deicing agent selected from the group consisting of sodium chloride, calcium magnesium acetate, calcium chloride, magnesium chloride, potassium chloride, potassium acetate, sodium acetate, sodium formate, and potassium formate as a component (a) and an aqueous solution comprising between 0% and its saturation concentration of the deicing agent, between 10 ppm and its saturation concentration of the native protein and between 10 ppm and its saturation concentration of the thickener as a component (b). Preferably, component (a) forms between 60 and 99.99% by weight of the kit of parts and component (b) forms between 0.01% and 40% by weight of the kit of parts (with component (a) and (b) adding up to 100%). Component (a) can be in the form of an aqueous solution, a slurry, or a solid (vide supra).

Component (b) can also be a solid mixture of native protein and thickener. Accordingly, the present invention also relates to a kit of parts for use in the process for deicing a surface according to the present invention comprising an anti-icing composition comprising a deicing agent selected from the group consisting of sodium chloride, calcium magnesium acetate, calcium chloride, magnesium chloride, potassium chloride, potassium acetate, sodium acetate, sodium formate, and potassium formate as a component (a) and a solid component comprising a native protein and a thickener as a component (b). Preferably, component (a) forms between 90 and 99.9% by weight of the kit of parts and component (b) forms between 0.1% and 10% by weight of the kit of parts (with component (a) and (b) adding up to 100%). Component (a) can be in the form of an aqueous solution, a slurry, or a solid (vide supra). Preferably, it is in the form of a solid.

As described above, the protein and the thickener are not equal. If the thickener is a native protein having thickener properties, a different type of native protein is added to the deicing agent.

Finally, the present invention relates to the use of a combination of a native protein and a thickener for improving the efficiency of a deicing composition comprising a deicing agent selected from the group consisting of sodium chloride, calcium magnesium acetate, calcium chloride, magnesium chloride, potassium chloride, potassium acetate, sodium acetate, sodium formate, and potassium formate, in the deicing of a surface. As said, said surface is preferably selected from the group consisting of non-porous asphalt road, asphalt road, porous asphalt road, concrete road, bituminous road, brick road, graveled path, cobbled road, unpaved road, and pavement.

The present invention is further illustrated by the following non-limiting Examples and Comparative Examples.

EXAMPLES

| Materials: | | |
|---|---|---|
| Abbreviation | Material | Origin |
| H₂O | Water | Tap water |
| NaCl | NaCl, Sanal P grade | AkzoNobel, Mariager, Denmark |
| AF | Na-CMC AF2985 | AkzoNobel, Arnhem, Netherlands |
| NC | Nanocellulose, Microfibrous cellulose, Axcel CG-PX | CP Kelco, Atlanta, USA |
| GH | Guar gum, DCol-FHG, 200 mesh size | ChemTotal, Jodhpur, India |
| LI | Lignosulphonate, Borresperse Na 244 | Borregaard Karlsruhe, Deutschland |
| SC | Safecote | Safecote Ltd., Northwich, UK |
| EW | spray dried egg white powder | Adriaan Goede BV, Landsmeer, Netherlands |
| EY | Yolk from fresh eggs | — |
| SP | spray dried powder of soy proteins isolate | Lucovitaal, PK Benelux/PharmaCare, Uden NL |
| WP | Whey Protein Concentrate | Springfield Neutraceuticals BV, Oud-Beijerland, Netherlands |

| Machines: | | |
|---|---|---|
| Machine | Origin | Settings |
| UltraTurrax, IKA S25N-18G | IKA, supplier: Avantec, Ochten, Netherlands | 6500-24000 rpm |
| Refrigerator | | −29 deg Celsius |

Sample Preparation

In all preparations below, 22 wt-% NaCl brine is referred to as "brine". Possible impurities in the products are not accounted for in the calculation of the final compound concentration; this concentration is defined as the ratio of weighed amount of compound and total mass of the sample.

Compound concentrations are expressed in ppm, herewith defined as mg compound/kg total sample mass.

Stock Solutions

All preparations were carried out batch wise. The mentioned amounts represent the typical batch size at which all samples were prepared.

Brine was prepared by the dissolution of 220 g NaCl into 780 g water.

The protein solutions were prepared by the slow addition of protein material to vigorously stirred brine. The brine as stirred by means of a magnetic stirrer. Protein stock solutions contained either 30,000 or 3,000 or 300 ppm protein.

The AF and GH solutions were prepared by careful addition to vigorously stirred brine. The brine was stirred by means of an UltraTurrax. The stock solutions contained 3,000 ppm AF or GH.

The LI solutions were prepared by addition of lignosulphonate powder to a vigorously stirred brine. The stock solutions contained either 3,000 ppm or 30,000 ppm LI.

The NC dispersions were prepared by careful addition to gently stirred brine. The brine was stirred by means of a magnetic stirrer. Once NC is well dispersed, the obtained dispersion was subjected to the UltraTurrax. The stock solutions contained 3,000 ppm NC.

The SC stock solutions were prepared by dilution of the commercially available Safecote product with brine (hereinafter denoted as a molasses comprising composition).

Final Solutions

The final sample solutions were obtained by mixing the protein and/or thickener stock solutions and the addition of brine. Three examples:

Brine containing 1,000 ppm EW and 1,000 ppm AF: mixing 10 grams of 3,000 ppm EW stock solution
10 grams of 3,000 ppm AF stock solution
10 grams of brine Brine containing 1,000 ppm EW and 10 ppm GH: mixing
  10 grams of 3,000 ppm EW stock solution
  0.1 grams of 3,000 ppm GH stock solution
  19.9 grams of brine
Brine containing 10,000 ppm EW and 1,000 ppm SC: mixing
  10 grams of 30,000 ppm EW stock solution
  10 grams of 3,000 ppm SC stock solution
  10 grams of brine
All samples had the exact total weight of 30 grams, contained in a Greiner tube (PP, 50 mL, Greiner BioOne).

Experimental Conditions

These Greiner tubes were stored in the fridge for maximum 2 days until the start of the experiment. Upon starting the experiment, the tubes were stored in the freezer at −29° C. and evaluated by eye for their solids content, with an accuracy of 5-10% per sample. The evaluation of solids content was done by eye, implying the estimation of solids content with respect to the total volume of the sample. All samples were prepared in three-fold and the presented solid contents are calculated as the average of all three samples.

Results

Table 1 is a matrix representation of all combinations of proteins and thickeners tested at different concentrations. The thickeners are arranged horizontally, with the leftmost column showing the samples without thickeners. The proteins are arranged vertically, with the uppermost row showing the samples without proteins. In the grey bars, the concentrations of the corresponding additives are given in ppm (mg/kg). All numbers in the white area represent the solids content after 24 hours.

The reference samples containing either a protein or a thickener do always show high solids content, although not always 100% solids. However, after longer time all these reference samples completely solidified without exception. All other samples comprising both a protein and a thickener do not solidify completely, if at all. In all cases the solid content is much lower than that of their respective references. From this table it can be derived that there is synergy between proteins and thickeners.

TABLE 1

|  |  |  | Thickeners |  |  |  |  |  |  |
|---|---|---|---|---|---|---|---|---|---|
|  |  |  | AF | NC | GH | LI ppm | LI | LI | LI |
|  |  |  | 0 | 1000 | 1000 | 1000 | 10 | 100 | 1000 | 10000 |
| Proteins | 0 |  | 100 | 90 | 90 | 100 | 100 | 100 | 98 | 100 |
|  | EW | 10 | 100 | 28 | 0 | 30 | — | — | 30 | — |
|  | EW | 100 | 87 | 0 | 0 | 0 | — | — | 0 | — |
|  | EW | 1000 | 100 | 60 | 0 | 27 | 0 | 0 | 0 | 32 |
|  | EW | 10000 | 100 | 0 | 33 | 33 | — | — | 0 | — |
|  | EY | 1000 | 100 | 0 | 60 | 50 | — | — | 63 | — |
|  | SP | 1000 | 93 | 60 | 53 | 30 | — | — | 0 | — |
|  | WP | 1000 | 90 | 63 | 0 | 63 | — | — | 0 | — |

In Table 2, detailed results of the experiments summarized in Table 1 are shown. For each entry it is mentioned which additives were present and the volume % of solids present in the sample after a certain time (in hours).

TABLE 2

| Ex. | Composition | | Data | | | | | | | | | | | |
|---|---|---|---|---|---|---|---|---|---|---|---|---|---|---|
| A | no additives | Time (h) | 0 | 1 | 2 | 3 | 5 | 6 | 120 | | | | | |
|  |  | Solids (%) | 0 | 0 | 87 | 100 | 100 | 100 | 100 | | | | | |
| B | 1000 ppm AF | Time (h) | 0 | 1 | 2 | 3 | 4 | 5 | 7 | 24 | 30 | 47 | 55 | 120 |
|  |  | Solids (%) | 0 | 0 | 9 | 25 | 32 | 45 | 63 | 90 | 100 | 100 | 100 | 100 |
| C | 1000 ppm NC | Time (h) | 0 | 1 | 2 | 3 | 4 | 4 | 6 | 8 | 24 | 55 | 120 | |
|  |  | Solids (%) | 0 | 0 | 40 | 40 | 50 | 50 | 80 | 80 | 90 | 93 | 100 | |
| D | 10 ppm GH | Time (h) | 0 | 1 | 2 | 3 | 60 | | | | | | | |
|  |  | Solids (%) | 0 | 0 | 100 | 100 | 100 | | | | | | | |
| E | 100 ppm GH | Time (h) | 0 | 1 | 2 | 3 | 60 | | | | | | | |
|  |  | Solids (%) | 0 | 0 | 100 | 100 | 100 | | | | | | | |
| F | 1000 ppm GH | Time (h) | 0 | 1 | 2 | 3 | 60 | | | | | | | |
|  |  | Solids (%) | 0 | 0 | 100 | 100 | 100 | | | | | | | |
| G | 10000 ppm GH | Time (h) | 0 | 2 | 3 | 4 | 5 | 7 | 24 | 26 | 29 | 31 | 48 | 53 | 72 |
|  |  | Solids (%) | 0 | 0 | 0 | 0 | 0 | 93 | 93 | 93 | 100 | 100 | 100 | 100 | 100 |
| H | 10 ppm LI | Time (h) | 0 | 2 | 4 | 6 | 24 | | | | | | | |
|  |  | Solids (%) | 0 | 80 | 93 | 100 | 100 | | | | | | | |
| I | 100 ppm LI | Time (h) | 0 | 2 | 3 | 5 | 6 | 7 | 8 | 25 | | | | |
|  |  | Solids (%) | 0 | 43 | 80 | 93 | 100 | 100 | 100 | 100 | | | | |
| J | 1000 ppm LI | Time (h) | 0 | 2 | 3 | 5 | 7 | 8 | 25 | | | | | |
|  |  | Solids (%) | 0 | 0 | 57 | 73 | 87 | 87 | 98 | | | | | |
| K | 10000 ppm LI | Time (h) | 0 | 2 | 4 | 6 | 24 | | | | | | | |
|  |  | Solids (%) | 0 | 27 | 73 | 93 | 100 | | | | | | | |
| L | 10 ppm EW | Time (h) | 0 | 1 | 2 | 3 | 60 | | | | | | | |
|  |  | Solids (%) | 0 | 0 | 100 | 100 | 100 | | | | | | | |
| M | 100 ppm EW | Time (h) | 0 | 1 | 2 | 3 | 4 | 5 | 6 | 7 | 24 | 30 | 47 | 55 | 120 |
|  |  | Solids (%) | 0 | 0 | 0 | 10 | 27 | 30 | 37 | 60 | 87 | 87 | 93 | 93 | 93 |

TABLE 2-continued

| Ex. | Composition | | Data | | | | | | | | | | | |
|---|---|---|---|---|---|---|---|---|---|---|---|---|---|---|
| N | 1000 ppm EW | Time (h) | 0 | 1 | 2 | 3 | 4 | 5 | 6 | 7 | 24 | 30 | 47 | 55 | 120 |
| | | Solids (%) | 0 | 0 | 0 | 37 | 43 | 50 | 63 | 88 | 100 | 100 | 100 | 100 | 100 |
| O | 10000 ppm EW | Time (h) | 0 | 1 | 2 | 3 | 60 | | | | | | | | |
| | | Solids (%) | 0 | 0 | 100 | 100 | 100 | | | | | | | | |
| P | 1000 ppm EY | Time (h) | 0 | 1 | 2 | 3 | 5 | 6 | 8 | 24 | 30 | | | | |
| | | Solids (%) | 0 | 0 | 3 | 25 | 55 | 55 | 55 | 100 | 100 | | | | |
| Q | 1000 ppm SP | Time (h) | 0 | 1 | 2 | 3 | 5 | 7 | 23 | 30 | 95 | | | | |
| | | Solids (%) | 0 | 0 | 0 | 8 | 28 | 60 | 93 | 93 | 93 | | | | |
| R | 1000 ppm WP | Time (h) | 0 | 1 | 2 | 3 | 5 | 7 | 23 | 30 | | | | | |
| | | Solids (%) | 0 | 0 | 27 | 32 | 85 | 85 | 90 | 93 | | | | | |
| 1 | 1000 ppm AF + 10 ppm EW | Time (h) | 0 | 2 | 3 | 4 | 5 | 7 | 24 | 26 | 29 | 31 | 48 | 53 | 72 |
| | | Solids (%) | 0 | 0 | 0 | 0 | 0 | 27 | 28 | 30 | 33 | 33 | 33 | 33 | 33 |
| 2 | 1000 ppm AF + 100 ppm EW | Time (h) | 0 | 2 | 3 | 4 | 5 | 7 | 24 | 26 | 29 | 31 | 48 | 53 | 72 |
| | | Solids (%) | 0 | 0 | 0 | 0 | 0 | 0 | 0 | 0 | 0 | 0 | 0 | 0 | 0 |
| 3 | 1000 ppm AF + 1000 ppm EW | Time (h) | 0 | 1 | 2 | 3 | 4 | 5 | 6 | 7 | 24 | 30 | 47 | 55 | 120 |
| | | Solids (%) | 0 | 0 | 0 | 5 | 27 | 47 | 53 | 53 | 60 | 60 | 60 | 60 | 63 |
| 4 | 1000 ppm AF + 10000 ppm EW | Time (h) | 0 | 1 | 2 | 3 | 4 | 6 | 8 | 24 | | | | | |
| | | Solids (%) | 0 | 0 | 0 | 0 | 0 | 0 | 0 | 0 | | | | | |
| 5 | 1000 ppm AF + 1000 ppm EY | Time (h) | 0 | 1 | 2 | 3 | 4 | 5 | 7 | 24 | | | | | |
| | | Solids (%) | 0 | 0 | 0 | 0 | 0 | 0 | 0 | 0 | | | | | |
| 6 | 1000 ppm AF + 1000 ppm SP | Time (h) | 0 | 1 | 2 | 3 | 5 | 7 | 23 | 30 | 95 | | | | |
| | | Solids (%) | 0 | 0 | 0 | 23 | 30 | 37 | 60 | 63 | 67 | | | | |
| 7 | 1000 ppm AF + 1000 ppm WP | Time (h) | 0 | 1 | 2 | 3 | 5 | 7 | 23 | 30 | | | | | |
| | | Solids (%) | 0 | 0 | 23 | 28 | 62 | 62 | 63 | 67 | | | | | |
| 8 | 1000 ppm NC + 10 ppm EW | Time (h) | 0 | 2 | 3 | 4 | 5 | 7 | 24 | 26 | 29 | 31 | 48 | 53 | 72 |
| | | Solids (%) | 0 | 0 | 0 | 0 | 0 | 0 | 0 | 0 | 0 | 0 | 0 | 0 | 0 |
| 9 | 1000 ppm NC + 100 ppm EW | Time (h) | 0 | 2 | 3 | 4 | 5 | 7 | 24 | 26 | 29 | 31 | 48 | 53 | 72 |
| | | Solids (%) | 0 | 0 | 0 | 0 | 0 | 0 | 0 | 0 | 0 | 0 | 0 | 0 | 0 |
| 10 | 1000 ppm NC + 1000 ppm EW | Time (h) | 0 | 1 | 2 | 3 | 4 | 5 | 6 | 7 | 24 | 30 | 47 | 55 | 120 |
| | | Solids (%) | 0 | 0 | 0 | 0 | 0 | 0 | 0 | 0 | 0 | 0 | 0 | 0 | 0 |
| 11 | 1000 ppm NC + 10000 ppm EW | Time (h) | 0 | 1 | 2 | 4 | 5 | 6 | 24 | 27 | | | | | |
| | | Solids (%) | 0 | 0 | 0 | 0 | 17 | 30 | 33 | 33 | | | | | |
| 12 | 1000 ppm NC + 1000 ppm EY | Time (h) | 0 | 1 | 2 | 3 | 4 | 5 | 6 | 23 | 25 | 29 | 46 | | |
| | | Solids (%) | 0 | 0 | 0 | 0 | 2 | 3 | 18 | 60 | 60 | 60 | 77 | | |
| 13 | 1000 ppm NC + 1000 ppm SP | Time (h) | 0 | 1 | 2 | 3 | 5 | 7 | 23 | 30 | 95 | | | | |
| | | Solids (%) | 0 | 0 | 0 | 0 | 10 | 43 | 53 | 60 | 63 | | | | |
| 14 | 1000 ppm NC + 1000 ppm WP | Time (h) | 0 | 1 | 2 | 3 | 5 | 7 | 23 | 30 | | | | | |
| | | Solids (%) | 0 | 0 | 0 | 0 | 0 | 0 | 0 | 0 | | | | | |
| 15 | 1000 ppm GH + 10 ppm EW | Time (h) | 0 | 2 | 3 | 4 | 5 | 7 | 24 | 26 | 29 | 31 | 48 | 53 | 72 |
| | | Solids (%) | 0 | 0 | 0 | 0 | 0 | 0 | 30 | 30 | 30 | 30 | 33 | 33 | 33 |
| 16 | 1000 ppm GH + 100 ppm EW | Time (h) | 0 | 2 | 3 | 4 | 5 | 7 | 24 | 26 | 29 | 31 | 48 | 53 | 72 |
| | | Solids (%) | 0 | 0 | 0 | 0 | 0 | 0 | 0 | 0 | 0 | 0 | 0 | 0 | 0 |
| 17 | 1000 ppm GH + 1000 ppm EW | Time (h) | 0 | 1 | 2 | 3 | 4 | 5 | 6 | 7 | 24 | 30 | 47 | 55 | 120 |
| | | Solids (%) | 0 | 0 | 0 | 20 | 17 | 20 | 23 | 23 | 27 | 27 | 30 | 67 | 67 |
| 18 | 1000 ppm GH + 10000 ppm EW | Time (h) | 0 | 1 | 2 | 4 | 5 | 6 | 24 | 27 | | | | | |
| | | Solids (%) | 0 | 0 | 0 | 0 | 27 | 30 | 33 | 33 | | | | | |
| 19 | 1000 ppm GH + 1000 ppm EY | Time (h) | 0 | 1 | 2 | 3 | 5 | 6 | 8 | 24 | | | | | |
| | | Solids (%) | 0 | 0 | 0 | 10 | 20 | 13 | 17 | 50 | | | | | |
| 20 | 1000 ppm GH + 1000 ppm SP | Time (h) | 0 | 1 | 2 | 3 | 5 | 7 | 23 | 30 | 95 | | | | |
| | | Solids (%) | 0 | 0 | 0 | 0 | 0 | 30 | 30 | 67 | | | | | |
| 21 | 1000 ppm GH + 1000 ppm WP | Time (h) | 0 | 1 | 2 | 3 | 5 | 7 | 23 | 30 | | | | | |
| | | Solids (%) | 0 | 0 | 47 | 53 | 63 | 65 | 65 | 63 | | | | | |
| 22 | 1000 ppm LI + 10 ppm EW | Time (h) | 0 | 2 | 3 | 5 | 6 | 7 | 8 | 25 | | | | | |
| | | Solids (%) | 0 | 0 | 0 | 0 | 0 | 0 | 0 | 30 | | | | | |
| 23 | 1000 ppm LI + 100 ppm EW | Time (h) | 0 | 2 | 3 | 5 | 6 | 7 | 8 | 25 | | | | | |
| | | Solids (%) | 0 | 0 | 0 | 0 | 0 | 0 | 0 | 0 | | | | | |
| 24 | 1000 ppm LI + 1000 ppm EW | Time (h) | 0 | 2 | 4 | 6 | 24 | | | | | | | | |
| | | Solids (%) | 0 | 0 | 0 | 0 | 0 | | | | | | | | |
| 25 | 1000 ppm LI + 10000 ppm EW | Time (h) | 0 | 2 | 3 | 5 | 6 | 7 | 8 | 25 | | | | | |
| | | Solids (%) | 0 | 0 | 0 | 0 | 0 | 0 | 0 | 0 | | | | | |
| 26 | 1000 ppm LI + 1000 ppm EY | Time (h) | 0 | 3 | 25 | 66 | | | | | | | | | |
| | | Solids (%) | 0 | 47 | 63 | 77 | | | | | | | | | |
| 27 | 1000 ppm LI + 1000 ppm SP | Time (h) | 0 | 2 | 3 | 5 | 6 | 7 | 8 | 25 | | | | | |
| | | Solids (%) | 0 | 0 | 0 | 0 | 0 | 0 | 0 | 0 | | | | | |
| 28 | 1000 ppm LI + 1000 ppm WP | Time (h) | 0 | 3 | 4 | 7 | 75 | | | | | | | | |
| | | Solids (%) | 0 | 0 | 0 | 0 | 0 | | | | | | | | |
| 29 | 10 ppm LI + 1000 ppm EW | Time (h) | 0 | 2 | 3 | 5 | 7 | 8 | 25 | | | | | | |
| | | Solids (%) | 0 | 0 | 0 | 0 | 0 | 0 | 0 | | | | | | |
| 30 | 100 ppm LI + 1000 ppm EW | Time (h) | 0 | 2 | 3 | 5 | 7 | 8 | 25 | | | | | | |
| | | Solids (%) | 0 | 0 | 0 | 0 | 0 | 0 | 0 | | | | | | |
| 31 | 10000 ppm LI + 1000 ppm EW | Time (h) | 0 | 3 | 4 | 7 | 25 | 75 | | | | | | | |
| | | Solids (%) | 0 | 30 | 30 | 31 | 32 | 33 | | | | | | | |

In Table 3, the results wherein a molasses comprising composition was used as the thickener are summarized. This Table shall be interpreted the same way as Table 1. The samples containing only a molasses comprising composition all fully solidify within 24 hours. The addition of proteins leads to a synergistic effect and none of these samples completely freeze over.

TABLE 3

|  |  | Molasses | | | |
|---|---|---|---|---|---|
|  |  | SC | SC ppm | SC | SC |
|  |  | 0 | 10 | 100 | 1000 | 10000 |
| Proteins | 0 | 100 | 100 | 100 | 100 | 100 |
|  | EW | 10 | 100 | — | — | 0 | — |
|  | EW | 100 | 87 | — | — | 0 | — |
|  | EW | 1000 | 100 | 0 | 0 | 0 | 0 |
|  | EW | 10000 | 100 | — | — | 0 | — |
|  | EY | 1000 | 100 | — | — | 27 | — |
|  | SP | 1000 | 93 | — | — | 0 | — |
|  | WP | 1000 | 90 | — | — | 30 | — |

In Table 4, detailed results of the experiments summarized in Table 3 are listed. For each entry it is mentioned which additives were present and the volume % of solids present in the sample after a certain time (in hours).

TABLE 4

| Ex. | Composition | | Data | | | | | | | | | | | | |
|---|---|---|---|---|---|---|---|---|---|---|---|---|---|---|---|
| S | 10 ppm SC | Time (h) | 0 | 1 | 2 | 3 | 4 | 6 | 8 | 24 | | | | | |
|  |  | Solids (%) | 0 | 0 | 43 | 43 | 47 | 50 | 53 | 100 | | | | | |
| T | 100 ppm SC | Time (h) | 0 | 1 | 2 | 3 | 5 | 6 | | | | | | | |
|  |  | Solids (%) | 0 | 0 | 73 | 98 | 100 | 100 | | | | | | | |
| U | 1000 ppm SC | Time (h) | 0 | 1 | 2 | 3 | 5 | 6 | | | | | | | |
|  |  | Solids (%) | 0 | 0 | 63 | 75 | 95 | 100 | | | | | | | |
| V | 10000 ppm SC | Time (h) | 0 | 2 | 3 | 4 | 6 | 7 | 8 | 72 | | | | | |
|  |  | Solids (%) | 0 | 2 | 33 | 37 | 67 | 83 | 87 | 100 | | | | | |
| 32 | 10 ppm EW + | Time (h) | 0 | 1 | 2 | 3 | 19 | 20 | 21 | 96 | | | | | |
|  | 1000 ppm SC | Solids (%) | 0 | 0 | 0 | 0 | 0 | 0 | 0 | 0 | | | | | |
| 33 | 100 ppm EW + | Time (h) | 0 | 2 | 3 | 4 | 5 | 7 | 24 | 26 | 29 | 31 | 48 | 53 | 72 |
|  | 1000 ppm SC | Solids (%) | 0 | 0 | 0 | 0 | 0 | 0 | 0 | 0 | 0 | 0 | 0 | 0 | 0 |
| 34 | 1000 ppm EW + | Time (h) | 0 | 2 | 3 | 4 | 5 | 7 | 24 | 26 | 29 | 31 | 48 | 53 | 72 |
|  | 1000 ppm SC | Solids (%) | 0 | 0 | 0 | 0 | 0 | 0 | 0 | 0 | 0 | 0 | 0 | 0 | 30 |
| 35 | 10000 ppm EW + | Time (h) | 0 | 2 | 3 | 4 | 5 | 7 | 24 | 26 | 29 | 31 | 48 | 53 | 72 |
|  | 1000 ppm SC | Solids (%) | 0 | 0 | 0 | 0 | 0 | 0 | 0 | 0 | 0 | 0 | 0 | 0 | 0 |
| 36 | 1000 ppm EY + | Time (h) | 0 | 1 | 2 | 3 | 4 | 6 | 8 | 24 | | | | | |
|  | 1000 ppm SC | Solids (%) | 0 | 0 | 13 | 13 | 17 | 20 | 23 | 27 | | | | | |
| 37 | 1000 ppm SP + | Time (h) | 0 | 1 | 2 | 3 | 19 | 20 | 21 | 96 | | | | | |
|  | 1000 ppm SC | Solids (%) | 0 | 0 | 0 | 0 | 0 | 0 | 0 | 0 | | | | | |
| 38 | 1000 ppm WP + | Time (h) | 0 | 1 | 2 | 3 | 19 | 20 | 21 | 96 | | | | | |
|  | 1000 ppm SC | Solids (%) | 0 | 0 | 0 | 0 | 28 | 30 | 30 | 80 | | | | | |
| 39 | 1000 ppm EW + | Time (h) | 0 | 1 | 2 | 3 | 4 | 6 | 8 | 24 | | | | | |
|  | 10 ppm SC | Solids (%) | 0 | 0 | 0 | 0 | 0 | 0 | 0 | 0 | | | | | |
| 40 | 1000 ppm EW + | Time (h) | 0 | 1 | 2 | 3 | 4 | 5 | 7 | 24 | | | | | |
|  | 100 ppm SC | Solids (%) | 0 | 0 | 0 | 0 | 0 | 0 | 0 | 0 | | | | | |
| 41 | 1000 ppm EW + | Time (h) | 0 | 1 | 2 | 3 | 4 | 5 | 7 | 24 | | | | | |
|  | 10000 ppm SC | Solids (%) | 0 | 0 | 0 | 0 | 0 | 0 | 0 | 0 | | | | | |

FIGS. 1-5 have been added for further illustration. The results of Comparative Examples A, B, and P and Example 5 (see Table 2) can be found in FIG. 1 with

| A | -*- | representing no additives |
|---|---|---|
| B | -o- | representing 1000 ppm AF |
| P | -Δ- | representing 1000 pm EY |
| 5 | -■- | representing 1000 ppm AF + 1000 ppm EY |

Figure 2:
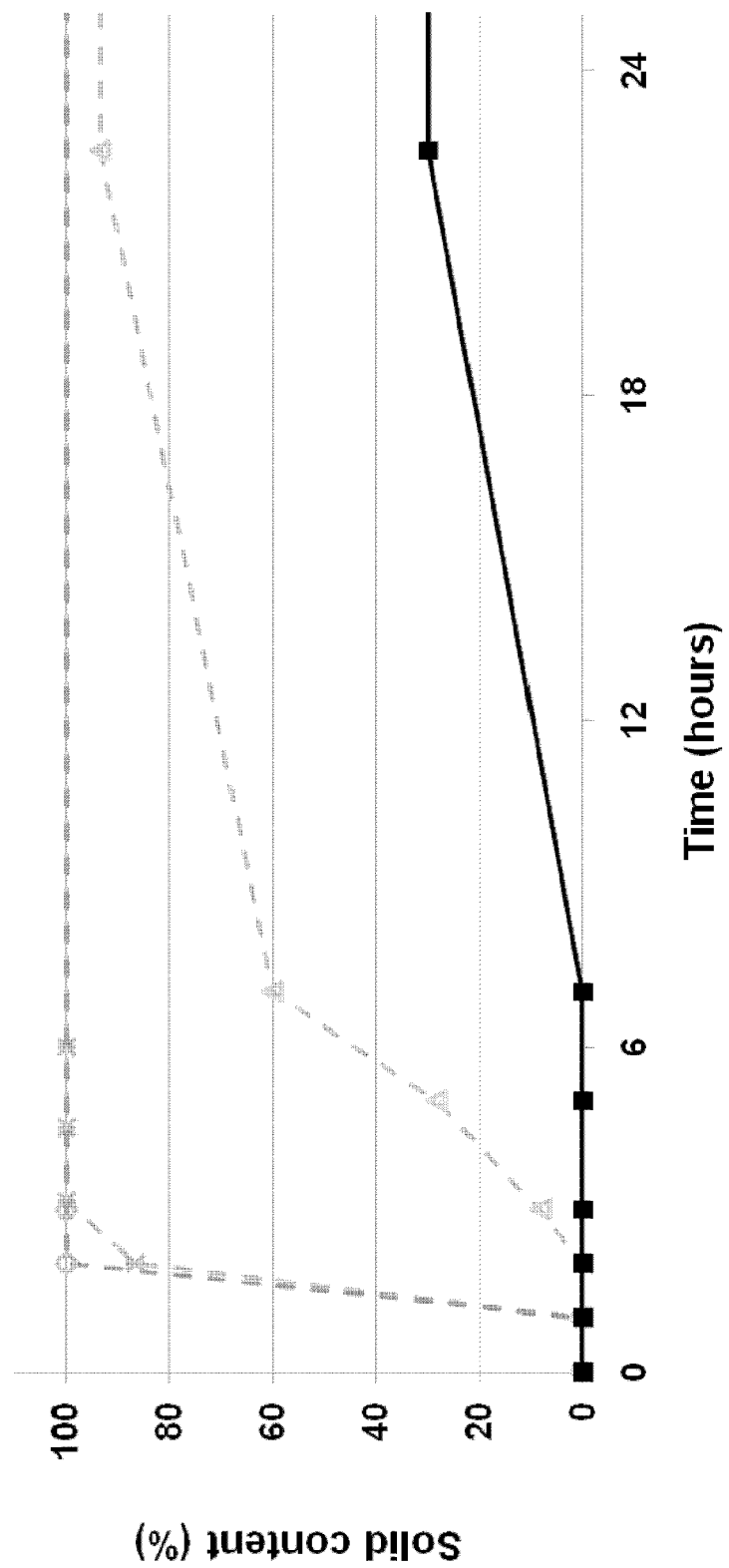
FIG. 2 is a graph of solid content (%) versus time (hours), showing the results of Comparative Examples A, F and Q, and Example 20.

The results of Comparative Examples A, F, Q, and Example 20 (see Table 2) can be found in FIG. 2, with

| A | -*- | representing no additives |
|---|---|---|
| F | -o- | representing 1000 ppm GH |
| Q | -Δ- | representing 1000 pm SP |
| 20 | -■- | representing 1000 ppm GH + 1000 ppm SP |

Figure 3:
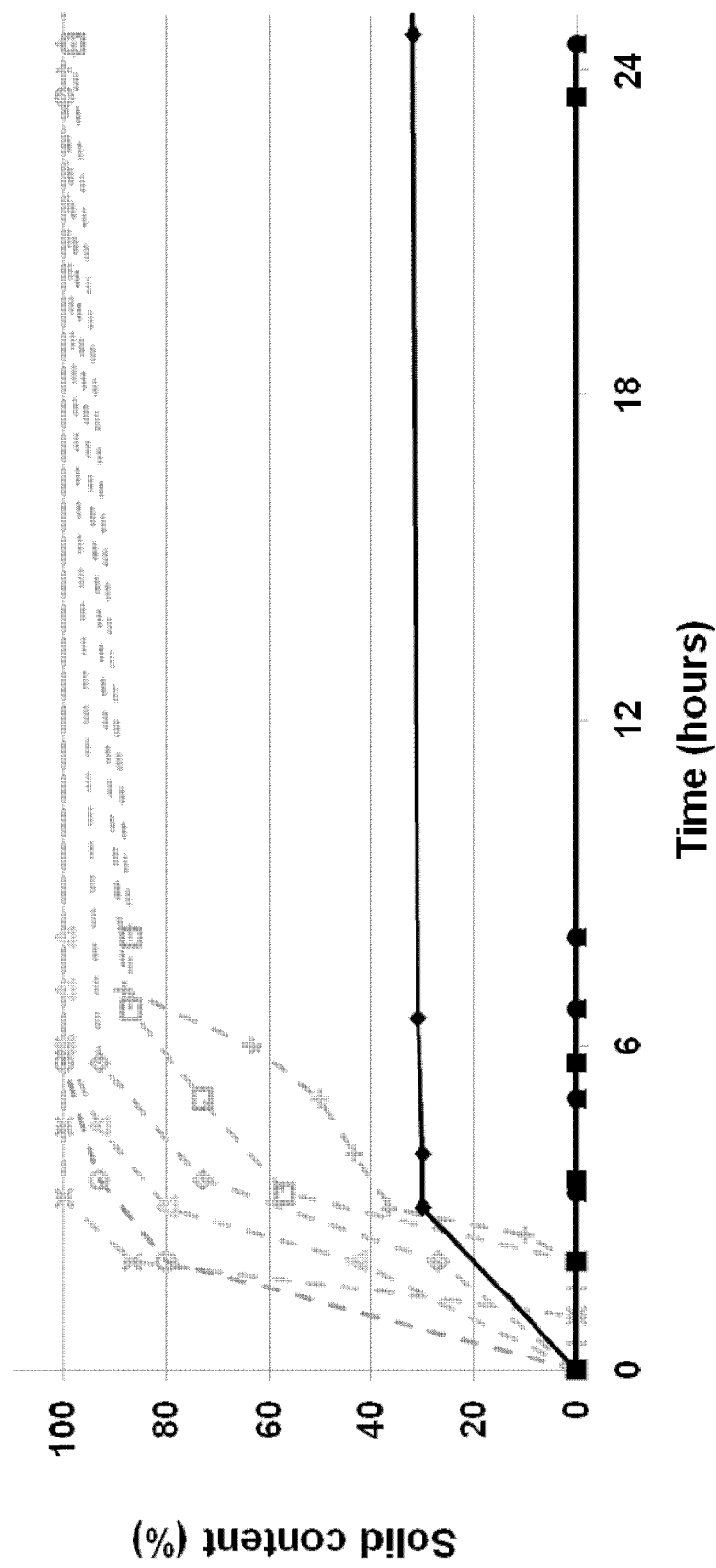
FIG. 3 is a graph of solid content (%) versus time (hours), showing the results of Comparative Examples A, H, I, J, K and N, and Examples 24, 29, 30 and 31.

The results of Comparative Examples A, H, I, J, K, N and Examples 24, 29, 30, 31 (see Table 2) can be found in FIG. 3, with

| A | -*- | representing no additives |
|---|---|---|
| H | -o- | representing 10 ppm LI |
| I | -Δ- | representing 100 ppm LI |
| J | -□- | representing 1000 ppm LI |
| K | -♦- | representing 10000 ppm LI |
| N | -+- | representing 1000 ppm EW |
| 29 | -●- | representing 10 ppm LI + 1000 ppm EW |
| 30 | -▲- | representing 100 ppm LI + 1000 ppm EW |
| 24 | -■- | representing 1000 ppm LI + 1000 ppm EW |
| 31 | -♦- | representing 10000 ppm LI + 1000 ppm EW |

Figure 4:
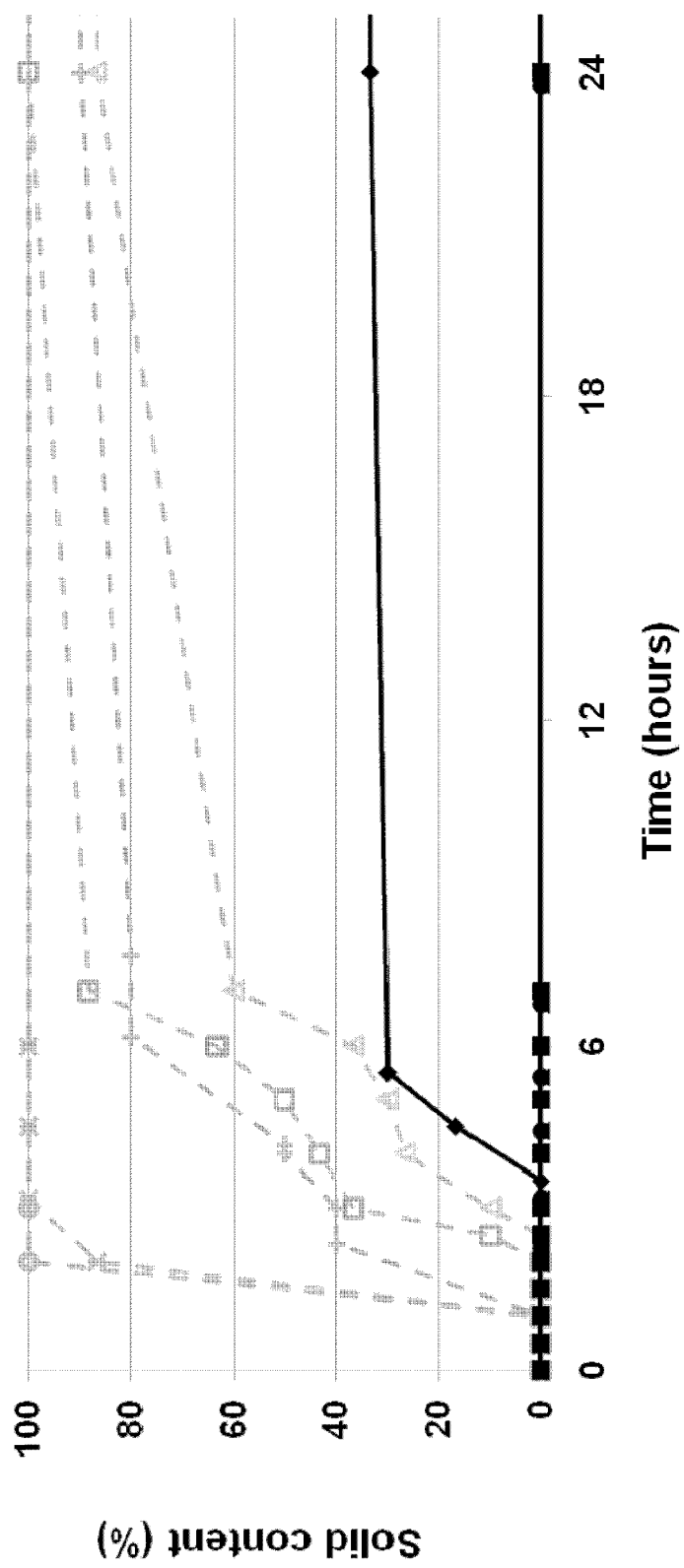
FIG. 4 is a graph of solid content (%) versus time (hours), showing the results of Comparative Examples A, C, L, M, N and O, and Examples 8, 9, 10 and 11.

The results of Comparative Examples A, C, L, M, N, O and Examples 8, 9, 10, 11 can be found in FIG. 4 with

| A | -*- | representing no additives |
|---|---|---|
| L | -o- | representing 10 ppm EW |
| M | -Δ- | representing 100 ppm EW |
| N | -□- | representing 1000 ppm EW |
| O | -♦- | representing 10000 ppm EW |
| C | -+- | representing 1000 ppm NC |
| 8 | -●- | representing 10 ppm EW + 1000 ppm NC |
| 9 | -▲- | representing 100 ppm EW + 1000 ppm NC |
| 10 | -■- | representing 1000 ppm EW + 1000 ppm NC |
| 11 | -♦- | representing 10000 ppm EW + 1000 ppm NC |

Figure 5:
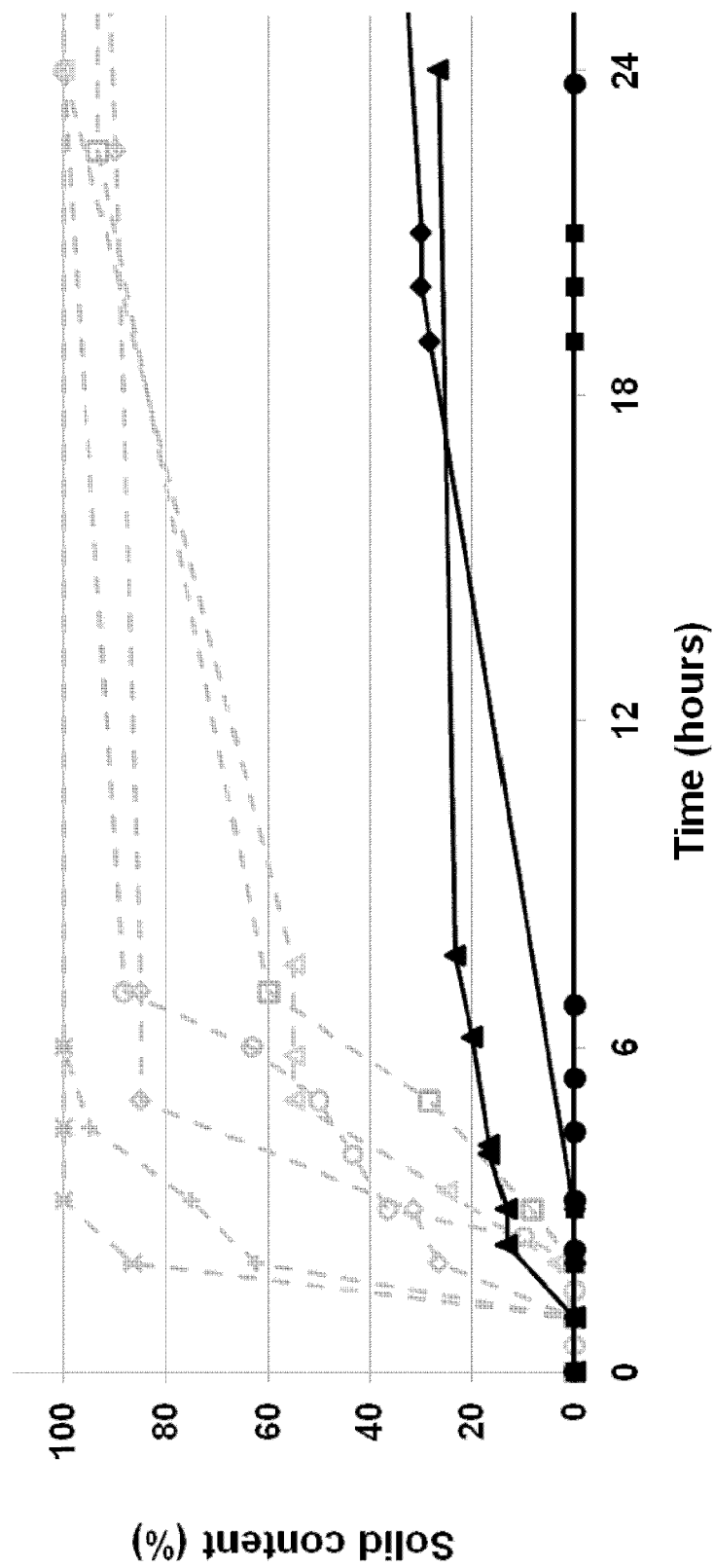
FIG. 5 is a graph of solid content (%) versus time (hours), showing the results of Comparative Examples A, J, L, M, N and Q, and Examples 27, 29, 30 and 31.

The results of Comparative Examples A, J, L, M, N, Q and Examples 27, 29, 30, 31 can be found in FIG. 5 with

| A  | -*- | representing no additives |
| N  | -o- | representing 1000 ppm EW |
| P  | -Δ- | representing 1000 ppm EY |
| Q  | -□- | representing 1000 ppm SP |
| R  | -♦- | representing 1000 ppm WP |
| U  | -+- | representing 1000 ppm SC |
| 34 | -●- | representing 1000 ppm EW + 1000 ppm SC |
| 36 | -▲- | representing 1000 ppm EY + 1000 ppm SC |
| 37 | -■- | representing 1000 ppm SP + 1000 ppm SC |
| 38 | -♦- | representing 1000 ppm WP + 1000 ppm SC |

All Figures show the synergy between proteins and thickeners. All grey dashed lines (samples containing only one component) go up quickly to 100% solid content, whereas all black solid lines (samples containing a mixture of protein and thickener) stay well below all grey dashed lines.

Proteic material naturally present in a molasses comprising composition clearly has no contribution to keeping brines liquid at very low temperatures. This is further supported by the observation that the addition of very little amounts of native protein (10 ppm) already leads to the synergistic effect (see Table 3, Table 4).

The invention claimed is:

1. A deicing composition comprising
   (i) a deicing agent selected from the group consisting of sodium chloride, calcium magnesium acetate, calcium chloride, magnesium chloride, potassium chloride, potassium acetate, sodium acetate, sodium formate, and potassium formate,
   (ii) a native protein, wherein the native protein is not a protein as present in molasses, and
   (iii) a thickener,
wherein components (ii) and (iii) are not the same.

2. The deicing composition according to claim 1 wherein the native protein is selected from the group consisting of soy based proteins, dairy based proteins, egg proteins and combinations thereof.

3. The deicing composition according to claim 1 wherein the thickener is selected from the group consisting of carboxymethyl cellulose, salts of carboxylmethyl cellulose, guar gum, nanocellulose, ethyl hydroxyethyl cellulose, methylethyl hydroxyethyl cellulose, propoxycellulose, methoxycellulose, ethoxycellulose, hydroxyethylcellulose, lignin derivatives, polyacrylates, polymaleinates, and copolymers of polyacrylates and polymaleinates.

4. The deicing composition according to claim 1 wherein the deicing composition is
   an aqueous deicing composition comprising at least 5% by weight, based on the total weight of the deicing composition, of deicing agent,
   a solid deicing composition comprising at least 50% by weight, based on the total weight of the deicing composition, of deicing agent, or
   a deicing composition in slurry form, comprising deicing agent in an amount higher than its saturation concentration.

5. The deicing composition according to claim 1 wherein the native protein is present in an amount of between 10 ppm and 10,000 ppm and the thickener is present in an amount of between 10 ppm and 10,000 ppm.

6. The deicing composition according to claim 1 wherein the thickener is carboxymethyl cellulose having a degree of substitution of between 0.4 and 1.0, and an average degree of polymerization of between 3000 and 8000, or a lignin derivative.

7. The deicing composition according to claim 1 wherein the deicing agent is sodium chloride.

8. The deicing composition according to claim 2 wherein the thickener is selected from the group consisting of carboxymethyl cellulose, salts of carboxylmethyl cellulose, guar gum, nanocellulose, ethyl hydroxyethyl cellulose, methylethyl hydroxyethyl cellulose, propoxycellulose, methoxycellulose, ethoxycellulose, hydroxyethylcellulose, lignin derivatives, polyacrylates, polymaleinates, and copolymers of polyacrylates and polymaleinates.

9. A process for preparing the deicing composition according to claim 1, the process comprising the step of spraying an aqueous treatment solution comprising the native protein and the thickener, onto the deicing agent selected from the group consisting of sodium chloride, calcium magnesium acetate, calcium chloride, magnesium chloride, potassium chloride, potassium acetate, sodium acetate, sodium formate, and potassium formate.

10. The process according to claim 9 wherein the deicing agent is sodium chloride and the native protein is present in the resulting deicing composition in an amount of between 10 ppm and 10,000 ppm and the thickener is present in the resulting deicing composition in an amount of between 10 ppm and 10,000 ppm.

11. The process according to claim 9 wherein the native protein is selected from the group consisting of soy based proteins, dairy based proteins, egg proteins and combinations thereof.

12. The process according to claim 9 wherein the thickener is selected from the group consisting of carboxymethyl cellulose, salts of carboxylmethyl cellulose, guar gum, nanocellulose, ethyl hydroxyethyl cellulose, methylethyl hydroxyethyl cellulose, propoxycellulose, methoxycellulose, ethoxycellulose, hydroxyethylcellulose, lignin derivatives, polyacrylates, polymaleinates, and copolymers of polyacrylates and polymaleinates.

13. A process for deicing a surface, said process comprising
   (i) the step of spreading the deicing composition according to claim 1 onto said surface; or
   (ii) the steps of mixing a solid deicing agent selected from the group consisting of sodium chloride, calcium magnesium acetate, calcium chloride, magnesium chloride, potassium chloride, potassium acetate, sodium acetate, sodium formate, and potassium formate with an aqueous treatment solution comprising a native protein and a thickener, and spreading the thus obtained mixture onto said surface, or
   (iii) the steps of preparing an aqueous solution comprising between 5% by weight and the saturation concentration of a solid deicing agent selected from the group consisting of sodium chloride, calcium magnesium acetate, calcium chloride, magnesium chloride, potassium chloride, potassium acetate, sodium acetate, sodium formate, and potassium formate; a native protein and a thickener and applying said mixture onto said surface, or
   (iv) the steps of spreading a deicing agent selected from the group consisting of sodium chloride, calcium magnesium acetate, calcium chloride, magnesium chloride, potassium chloride, potassium acetate, sodium acetate, sodium formate, and potassium formate, in solid or aqueous form onto said surface and separately spreading a native protein and a thickener in solid or aqueous form onto said surface.

14. The process according to claim 13 wherein the deicing agent is sodium chloride.

15. The process according to claim 13 wherein the native protein is selected from the group consisting of soy based proteins, dairy based proteins, egg proteins and combinations thereof.

16. The process according to claim 13 wherein the thickener is selected from the group consisting of carboxymethyl cellulose, salts of carboxylmethyl cellulose, guar gum, nanocellulose, ethyl hydroxyethyl cellulose, methylethyl hydroxyethyl cellulose, propoxycellulose, methoxycellulose, ethoxycellulose, hydroxyethylcellulose, lignin derivatives, polyacrylates, polymaleinates, and copolymers of polyacrylates and polymaleinates.

17. The process according to claim 13 wherein the surface is selected from the group consisting of non-porous asphalt road, asphalt road, porous asphalt road, concrete road, bituminous road, brick road, graveled path, cobbled road, unpaved road, and pavement.

18. The process according to claim 13 wherein between 1 and 50 g of the deicing agent, between 0.01 and 500 mg of the native protein and between 0.01 and 500 mg of the thickener is introduced per $m^2$ of said surface.

19. A kit of parts for use in the process according to claim 13, the kit of parts comprising
- an anti-icing composition comprising the deicing agent selected from the group consisting of sodium chloride, calcium magnesium acetate, calcium chloride, magnesium chloride, potassium chloride, potassium acetate, sodium acetate, sodium formate, and potassium formate as a component (a), and
- either (i) an aqueous solution comprising between 0% and its saturation concentration of the deicing agent, between 10 ppm and its saturation concentration of the native protein and between 10 ppm and its saturation concentration of the thickener or (ii) a solid component comprising the native protein and the thickener as a component (b).

20. The kit of parts according to claim 19 wherein component (b) is the aqueous solution comprising between 0% and its saturation concentration of the deicing agent, between 10 ppm and its saturation concentration of the native protein and between 10 ppm and its saturation concentration of the thickener, and wherein component (a) forms between 60 and 99.99% by weight of the kit of parts and component (b) forms between 0.01% and 40% by weight of the kit of parts.

* * * * *